(12) United States Patent
Fuchs et al.

(10) Patent No.: US 10,018,221 B2
(45) Date of Patent: Jul. 10, 2018

(54) FRACTURE-SEPARATED ENGINE COMPONENT AND METHOD FOR MANUFACTURING SAME

(71) Applicant: BRP-ROTAX GMBH & CO. KG, Gunskirchen (AT)

(72) Inventors: Thomas Fuchs, Lambach (AT); Uwe Wieser-Christian, Pichl/Wels (AT); Juergen Nemesch, St. Marien (AT)

(73) Assignee: BRP-ROTAX GMBH & CO. KG, Gunskirchen (AT)

( * ) Notice: Subject to any disclaimer, the term of this patent is extended or adjusted under 35 U.S.C. 154(b) by 49 days.

(21) Appl. No.: 15/361,040

(22) Filed: Nov. 24, 2016

(65) Prior Publication Data

US 2017/0146053 A1 May 25, 2017

(30) Foreign Application Priority Data

Nov. 24, 2015 (AT) .............................. A 51004/2015

(51) Int. Cl.
*F16C 9/04* (2006.01)
*F02F 1/24* (2006.01)
(Continued)

(52) U.S. Cl.
CPC ................ *F16C 9/045* (2013.01); *C23C 8/26* (2013.01); *C23C 8/80* (2013.01); *F02F 1/24* (2013.01);
(Continued)

(58) Field of Classification Search
CPC .. F16C 9/045; F16C 7/023; F16C 3/06; C23C 8/26; C23C 8/80
See application file for complete search history.

(56) References Cited

U.S. PATENT DOCUMENTS 3,994,054 A 11/1976 Cuddon-Fletcher et al.
6,961,997 B2 11/2005 Kubota et al.
(Continued)

FOREIGN PATENT DOCUMENTS

DE 1521172 A1 7/1969
DE 2246440 A1 4/1974
(Continued)

OTHER PUBLICATIONS

English abstract of DE102015106956 translated by EPO/GOOGLE on May 16, 2017.
(Continued)

*Primary Examiner* — Jacob Amick
(74) *Attorney, Agent, or Firm* — BCF LLP (57) ABSTRACT

A fracture-separated engine component and a method for manufacturing same is described. The engine component includes first and second parts each having a fracture surface extending along a fracture plane. Prior to fracture separation, the engine component is case-hardened by nitriding and has a nitriding hardness depth of 0.4 to 0.7 mm. After the nitriding, the engine component is cooled such that each one of the subsequent fracture surfaces reaches a temperature below −100° C. The fracture separation is then performed. After, the engine component has two fracture surfaces along a fracture plane, the fracture surfaces having hardened peripheral areas and unhardened core sections. No point of the unhardened core sections located in the fracture plane is located at a distance greater than 1.1 mm from a nearest hardened peripheral area. Each one of the fracture surfaces includes elongated partial fracture surfaces with a width of less than 3.2 mm.

20 Claims, 3 Drawing Sheets

(51) Int. Cl.
*F16C 7/02* (2006.01)
*F16C 3/06* (2006.01)
*C23C 8/26* (2006.01)
*C23C 8/80* (2006.01)
*F16C 3/12* (2006.01)
*F16C 7/00* (2006.01)

(52) U.S. Cl.
CPC ............... *F16C 3/06* (2013.01); *F16C 7/023* (2013.01); *F16C 3/12* (2013.01); *F16C 7/00* (2013.01); *F16C 2223/14* (2013.01); *F16C 2360/22* (2013.01)

(56) References Cited

U.S. PATENT DOCUMENTS

| | | | |
|---|---|---|---|
| 2003/0098095 A1 | 5/2003 | Inoue et al. | |
| 2004/0025340 A1* | 2/2004 | Kubota | F16C 9/045 29/888.09 |
| 2004/0159178 A1* | 8/2004 | Nakajima | F16C 7/023 74/593 |
| 2004/0159179 A1* | 8/2004 | Kubota | F16C 7/023 74/593 |
| 2005/0126533 A1* | 6/2005 | Iwasaki | F16C 7/023 123/197.3 |
| 2008/0000553 A1 | 1/2008 | Sano et al. | |

FOREIGN PATENT DOCUMENTS

| | | |
|---|---|---|
| DE | 102008003031 A1 | 7/2009 |
| DE | 102011001060 A1 | 9/2011 |
| DE | 102014117874 A1 | 6/2015 |
| DE | 102015106956 A1 | 3/2016 |
| EP | 1382866 A2 | 1/2004 |
| EP | 1955799 A1 | 8/2008 |
| JP | S63195408 A | 8/1988 |

OTHER PUBLICATIONS

English abstract of JPS63195408; retrieved from https://worldwide.espacenet.com/ on May 15, 2017.
English abstract of EP1955799; retrieved from https://worldwide.espacenet.com/ on May 15, 2017.
European Search Report of European Application No. 16200398.2; Manfred, Hutter; issued by the EPO dated Apr. 7, 2017, The Hague.
Translation of English abstract of DE102014117874; obtained from https://worldwide.espacenet.com/ on Nov. 16, 2016.
English abstract of DE2246440; retrieved from https://worldwide.espacenet.com/ on Nov. 16, 2016.
English abstract of DE102008003031; retrieved from https://worldwide.espacenet.com/ on Nov. 16, 2016.
English abstract of DE102011001060; retrieved from https://worldwide.espacenet.com/ on Nov. 16, 2016.
English abstract of EP1955799; retrieved from https://worldwide.espacenet.com/ on Nov. 16, 2016.

* cited by examiner

FRACTURE-SEPARATED ENGINE COMPONENT AND METHOD FOR MANUFACTURING SAME

CROSS-REFERENCE

The present application claims priority to Austrian Patent Application No. 51004/2015, filed on Nov. 24, 2015, the entirety of which is incorporated herein by reference.

FIELD OF THE TECHNOLOGY

The present technology relates to a fracture-separated engine component and a method for manufacturing same.

BACKGROUND

The present technology relates to an engine component and a method of manufacturing the engine component by fracture separation. In particular, the present technology relates to the manufacturing of fracture separated connection rods (crack connecting rod).

From U.S. Pat. No. 3,994,054 A, it is known that in a crack connecting rod, at least one borehole is to be provided. The borehole extends parallel to the bearing eye and the fracture surface extends in the longitudinal direction of the borehole.

EP 1382866 B1 (U.S. Pat. No. 6,961,997 B2) discloses a method for the manufacturing of crack connecting rods in which the bearing eye of the crankshaft is hardened by case-hardening and then fracture-separated, whereby a defined hardening depth in the material and thereby a defined fracture pattern is achieved by suitable dimensioning and process parameters.

EP 1955799 B1 also discloses a method for the manufacturing of crack connecting rods in which the bearing eye of the crankshaft is hardened by case-hardening and is subsequently fracture-separated, whereby a defined hardening depth in the material and thereby a defined fracture pattern is reached by suitable dimensioning and process parameters.

It has been found to be disadvantageous that the steel connecting rods that are case-hardened by carburization and used in engines with a high power density, such as high-performance two-stroke engines in particular, are not able to satisfy the thermal requirements because when the steel that is case-hardened by carburization is exposed to an excessively high temperature, the surface hardness of the steel drops.

DE 102014117874 A1 proposes nitriding as an alternative treatment to carburization for case-hardening of the connecting rod, although it is not defined what the technically vague concept of "nitriding" refers to. DE 102014117874 A1 does not clearly indicate to what the term "nitriding" refers, since according to DE 102014117874 A1, martensite is to be formed by the "nitriding" in the same way as when the steel is subjected to carburization. Since according to DE 102014117874 A1 "nitriding" brings about a structural transformation, i.e. the formation of martensite, it can be excluded that the term "nitriding" that is used in this document refers to the nitriding treatment within the meaning of the present technology, that is where nitriding precipitation hardening occurs and where no martensite is formed such as in transformation hardening, occurring for example during carburization.

However, it is known that due to the different behaviour of steel that can be case-hardened by nitriding, fracture separation cannot be carried out in a similar manner as for steel that has been case-hardened by carburization. In particular, it is known that steel that can be case-hardened by nitriding does not exhibit brittle fracture behaviour in areas of its cross-sectional surface that are not reached by the nitriding case-hardening of the surface. Due to the plastic deformation of the material, the two fracture surfaces can no longer be assembled, or assembled with sufficient accuracy. No solution to this problem is disclosed in DE 102014117874 A1.

There is therefore a desire to provide fracture-separated engine components, in particular fracture-separated connecting rods, that have greater resistance to high temperatures, or to render practicable the fracture separation of engine components, in particular connecting rods, that have been case-hardened by nitriding.

SUMMARY

It is an object of the present technology to ameliorate at least some of the inconveniences present in the prior art.

In order to address the aforementioned challenges, the present technology aims at reliably make a connecting rod that has been case-hardened by nitriding and is separable by brittle fracture through an appropriate design of the fracture surface.

According to an aspect of the present technology, there is provided a fracture-separated engine component for an internal combustion engine including first and second parts each having a fracture surface extending along a fracture plane. The engine component is case-hardened by nitriding and has a nitriding hardness depth of 0.4 to 0.7 mm. The two fracture surfaces have hardened peripheral areas and unhardened core sections, and no point of the unhardened core sections located in the fracture plane is located at a distance greater than 1.1 mm from a nearest hardened peripheral area.

In some implementations, at least one opening extends longitudinally in the fracture plane of each of the two fracture surfaces, such that each fracture surface is separated into at least two elongated partial fracture surfaces, and none of the at least two elongated partial fracture surfaces has a width of more than 3.2 mm.

In some implementations, at least one of the two fracture surfaces includes at least two openings extending longitudinally in the fracture plane of each of the two fracture surfaces, such that each of the two fracture surfaces is separated into at least three elongated partial fracture surfaces, and none of the elongated partial fracture surfaces has a width of more than 3.2 mm.

In some implementations, a borehole extends perpendicularly to the fracture plane through the fracture surfaces.

In some implementations, each one of the at least one opening defined in the fracture plane of each fracture surface extends at least partially through the borehole.

In some implementations, each one of the unhardened core sections of the fracture surfaces is completely enclosed by a corresponding one of the hardened peripheral areas.

In some implementations, the first and second parts of the engine component form a connecting rod having a bearing eye including a running surface.

In some implementations, at least one of the two fracture surfaces has a notch that is spaced from the running surface of the bearing eye.

In some implementations, the notch is a laser score.

In some implementations, the engine component is a connecting rod having a bearing eye; and centres of all of the at least one opening and the bearing eye are located on a straight line.

In some implementations, the distance is smaller than or equal to 0.9 mm.

In some implementations, the engine component is one of a connecting rod, a crankshaft and a cylinder head.

According to a further aspect of the present technology, the wall thickness of the material in the fracture surface is limited to the maximum value at which the steel does not undergo plastic deformation in the fracture surface. In particular, there is provided a fracture-separated connecting rod for a combustion engine, the fracture-separated connecting rod being case-hardened by nitriding with a nitriding hardness depth of 0.4 to 0.7 mm. The fracture surfaces of the connecting rod have hardened peripheral areas and unhardened core areas. No point of the unhardened core area located in the fracture plane has a distance which is greater than 1.1 mm from the closest hardened peripheral area.

In some implementations of the present technology, the maximum wall thickness of the connecting rod in the fracture surface is approximately 3 mm. In order to achieve sufficient stability and create enough space to receive the fixing screws, it is proposed to form the cross-sectional surface of the connecting rod in the fracture surface by a plurality of unconnected partial areas, where each partial area has a maximum wall thickness of approximately 3 mm.

In some implementations of the present technology, the wall thickness in the fracture surface of the connecting rod is limited by the fact that at least one opening extends through the fracture surface parallel to the bearing eye.

In some implementations of the present technology, the connecting rod is made of the steel 31CrMoV9, which can be case-hardened by nitriding, the steel having a carbon content of approximately 0.32%.

According to another aspect of the present technology, there is provided a method for manufacturing an engine component. The method involves:
providing the engine component such that each one of subsequent fracture surfaces has a cross sectional face including elongated partial fracture surfaces with a width of less than 3.2 mm;
nitriding the engine component until a nitriding hardness depth of 0.4 to 0.7 mm is reached;
cooling the engine component such that each one of the subsequent fracture surfaces reaches a temperature below −100° C.; and
fracture-separating the engine component at at least one predetermined fracture point into at least two parts while the temperature of each one of the subsequent fracture surfaces is below −100° C.

In some implementations, the method further includes providing at least one notch defining one of the at least one predetermined fracture point.

In some implementations, the step of nitriding has a duration of approximately 80 hours.

In some implementations, the step of cooling brings the temperature of the engine component between −120° C. and −130° C.

In some implementations, the step of fracture-separating is performed with a force of 2 to 4 kN.

In some implementations, the step of fracture-separating is performed 5 to 30 seconds after the cooling step.

In some implementations, the method further includes providing at least one borehole in the engine component before the nitriding step.

According to a further aspect of the present technology, there is provided a method for the manufacturing of a fracture-separated connecting rod (starting from a connecting rod with bearing eyes without further holes) involving the following steps:
drilling two boreholes extending through the subsequent fracture surfaces;
drilling/milling of at least one opening, whose longitudinal direction extends in the fracture plane or in the subsequent fracture surfaces;
nitriding case-hardening of the connecting rod until a nitriding hardening depth of approximately 0.4 to approximately 0.7 mm is reached;
providing a core drilling in each one of the two boreholes;
providing the two core drillings with a thread;
laser puncturing of at least one partial area of the subsequent fracture surfaces in order to specify a predetermined starting point of the fracture;
cooling the connecting rod or an area around the bearing eye in liquid nitrogen for approximately 40 seconds down to a temperature below −100° C.; and
fracture-separating the connecting rod.

In some implementations, the step of the nitriding case-hardening has a duration of approximately 80 hours.

In some implementations, the step of cooling brings the temperature of the connecting rod or of the bearing eye to approximately −120° C. to −130° C.

In some implementations, the step of fracture-separating the connection rod is performed approximately 10 seconds after removal from the liquid nitrogen.

In some implementations, the step of fracture-separating the connection rod is performed with a force of 2 to 4 kN.

In some implementations, the at least one opening that extends in the longitudinal direction through the subsequent fracture surfaces is present in the form of a borehole or of a slotted borehole. In some implementations, the at least one opening is two openings that are present in the form of boreholes.

In some implementations, the laser puncturing is performed so as to be spaced from the running surface of the bearing eye, on one side of the bearing eye, in the first partial surface of the subsequent fracture surface adjacent to the bearing eye, and the holes produced by laser puncturing extend parallel to the bearing eye.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE FIGURES

For a better understanding of the present technology, as well as other aspects and further features thereof, reference is made to the following description which is to be used in conjunction with the accompanying figures, which are not true to scale.

DETAILED DESCRIPTION

The present detailed description is intended to be a description of illustrative implementations of the present technology. In the present description, the term "engine component" is to be understood as part of an internal combustion engine in the form, for example, of a cylinder head, a connecting rod or a crankshaft. For exemplary purpose, the engine component that will be described in the following description is a connecting rod, but other engine components, such as a cylinder head or a crankshaft, are contemplated for the implementation of the present technology.

Figure 1:
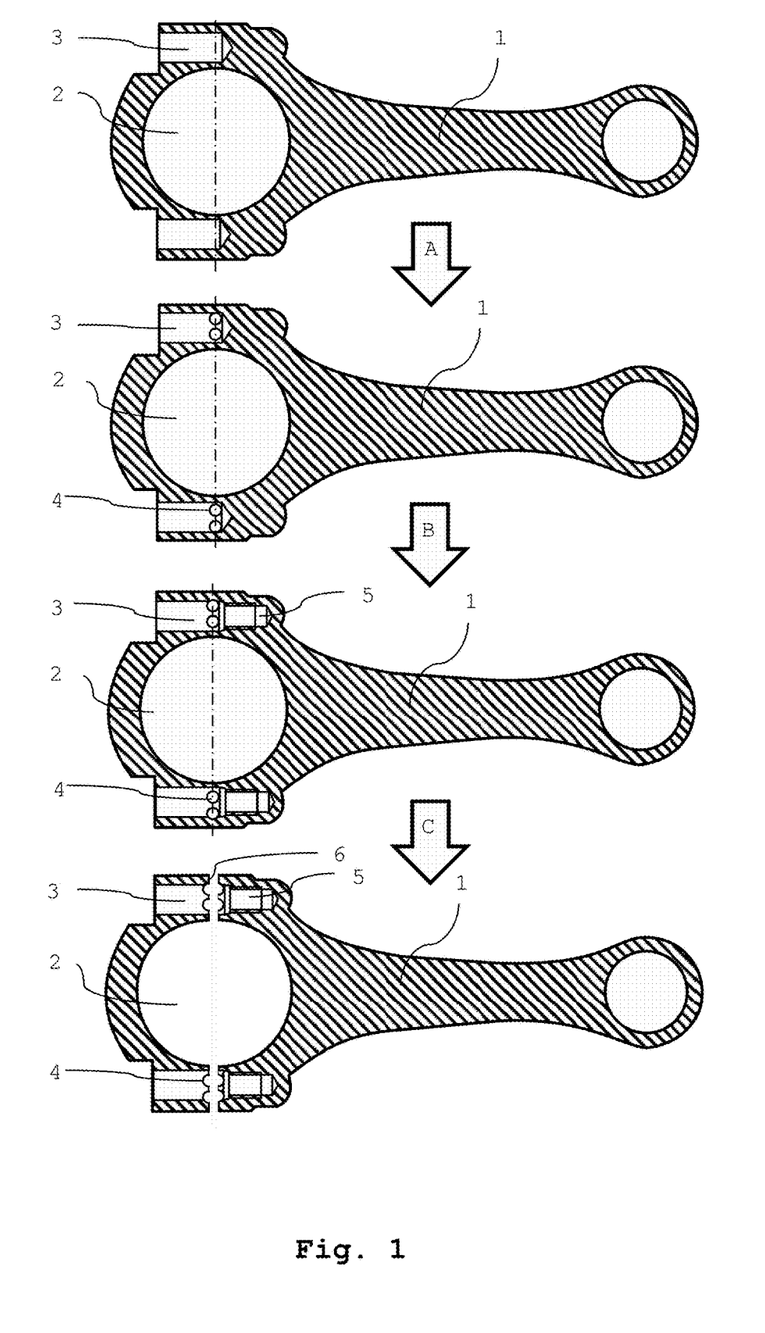
FIG. 1 schematically shows the method of the present technology based on four representations of a connecting rod according to the present technology after the execution of the successive method steps.

FIG. 1 illustrates the manufacturing method of a connecting rod 1 according to the present technology. At the very top of FIG. 1, the connecting rod 1 is shown before the application of the manufacturing method according to the present technology. The connecting rod 1 has a small eye for the piston pin and a bearing eye 2 for the crankshaft and is already provided with two boreholes 3 that are located next to the bearing eye 2. The two boreholes 3 extend through the subsequent fracture surfaces 6, i.e. obtained after fracture separation. The fracture separation provides first and second parts each having a fracture surface 6. The fracture surfaces 6 extend along a fracture plane, as will be described below. The two boreholes 3 extend perpendicularly to the fracture plane through the fracture surfaces 6, but could extend otherwise in other implementations. In a variant, the two boreholes 3 could be omitted from the connecting rod 1.

In the first step A of the method according to the present technology, the connecting rod 1 is provided with at least one opening 4, which is created as a borehole that extends parallel to the longitudinal direction of the bearing eye 2 through the connecting rod 1. In other implementations, the at least one opening 4 could extend otherwise. In the example of FIG. 1, the connecting rod 1 is provided in the first step A with two openings 4 in the form of boreholes provided at least partially in each one of the two boreholes 3. The central points of all openings 4 and the bearing eye 2 are located on a straight line, shown as a dot-dash line in FIG. 1. In some implementations, the straight line contains the fracture plane. The central points of all openings 4 and the bearing eye 2 could be located otherwise. As seen in FIG. 1, the two openings 4 defined in the fracture plane of each fracture surface 6 extend at least partially through their respective borehole 3, at an angle of 90° therefrom. Other angles are possible.

In the second step B, the connecting rod 1 is casehardened by nitriding and then provided with core drillings 5 in the boreholes 3. The nitriding process is performed using known methods, such as gas-nitriding, but other nitriding methods could be used. In the present implementation, the connecting rod 1 is exposed to a nitrogen atmosphere at temperatures of approximately 500° C. to 600° C. for several hours. In some implementations, the connecting rod 1 is gas-nitrided for approximately 60 to 90 hours, so that a nitriding hardness depth of 0.4 to 0.7 mm is reached. In some implementations, the nitriding process has a duration of approximately 80 hours. After the nitriding process is performed, core drillings 5 having a smaller diameter than that of the boreholes 3 are provided in the boreholes 3, and subsequently the core drillings 5 are provided with a thread. As a result, the thread is cut entirely into the tough core of the steel and not in the hardened peripheral area caused by the nitriding process. In some implementations, before providing the core drillings 5, the boreholes 3 are slightly lengthened so that the hardened bottom of the boreholes 3 is removed. The core drillings 5 terminate in the material of the connecting rod 1. In some implementations, the core drillings 5 may extend completely through the connecting rod 1 to the opposite side.

The connecting rod 1 is further provided with at least one predetermined fracture point for the fracture separation. In some implementations, the at least one predetermined fracture point is defined by a notch. In some implementations, the notch is provided by laser scoring, whereby one area of one of the two subsequent fracture surfaces is punctured with a laser to produce many small holes. The notch, or laser score, defines a starting point for the fracture of the connecting rod 1, and thereby make the fracture separation more controllable.

In the third step C, the connecting rod 1 is cooled to a low temperature that will be described below and subsequently fracture-separated. In some implementations, the connecting rod 1 or at least an area around the bearing eye 2 is cooled in liquid nitrogen for a duration of between 30 and 60 seconds, so that the connecting rod 1 or at least the area around the bearing eye 2 cools to approximately −100° C. to −150° C. In some implementations, the cooling brings the temperature of the connecting rod 1 or at least the area around the bearing eye 2 to approximately −120° C. to −130° C. Other cooling times and temperatures are contemplated. Fracture separation is then carried out while the temperature of each one of the resulting fracture surfaces 6 is below −100° C. In some implementations, the fracture separation is carried out not later than two minutes after the connecting rod 1 is removed from the liquid nitrogen. In some implementations, fracture separation is performed 5 to 30 seconds after the connecting rod 1 has been cooled, i.e. after removal from the liquid nitrogen. In some implementations, fracture separation is performed 10 seconds after the connecting rod 1 has been cooled. Fracture separation is performed at the at least one predetermined fracture point, resulting in the connecting rod 1 being separated into two parts. In some implementations, the fracture separation is performed with a force of 2 to 4 kN. In some implementations, the fracture separation is performed by driving a hydraulic expanding mandrel into the bearing eye 2. Fracture separation can also be carried out or supported through the use of expanding mandrels in the openings 4. Fracture separation results in the connecting rod 1 having two fracture surfaces 6 along the fracture plane. Each one of the two resulting fracture surfaces 6 passes through the respective boreholes 3 and openings 4. The two parts of the connecting rod 1 consists of a base body, which contains the small bearing eye, and a bearing cover that has been fracture separated from the base body along the fracture plane, so that the base body and bearing cover have mating contact surfaces. Even with the slight irregularities in the fracture surfaces 6, precise positional accuracy is obtained when the bearing cover is screwed to the base body.

Figure 2:
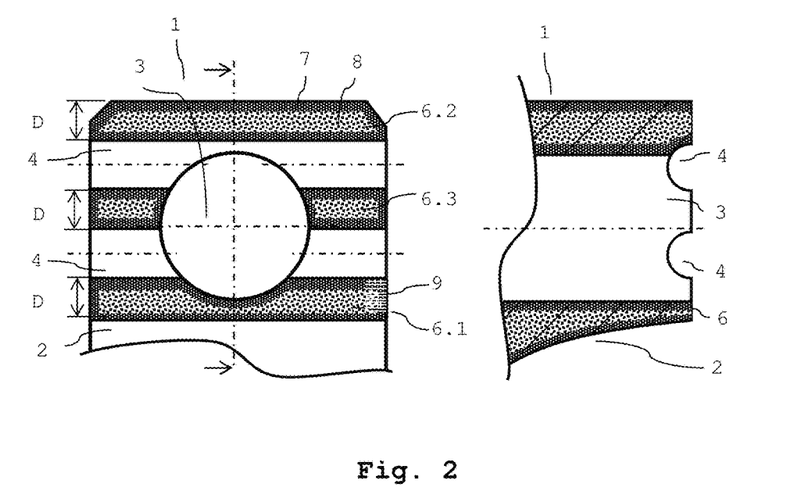
FIG. 2 schematically shows a fracture surface of a connecting rod according to the present technology in a top plan view and in a lateral cross-sectional view.

In a top plan view showing the fracture surface 6 and a cross-sectional side view with a longitudinal cross-section through the borehole 3, FIG. 2 shows in detail the characteristic fracture surface 6 of the connecting rod 1 which results from the method according to the present technology.

As can be seen in the left-hand section of FIG. 2, the fracture surface 6 has several elongated partial fracture surfaces 6.1, 6.2, 6.3, which are separated from one another by the openings 4. The openings 4 extend longitudinally in the fracture plane of each of the two fracture surfaces 6. Each fracture surface 6 is separated into the elongated partial fracture surfaces 6.1, 6.2, 6.3, and none of the elongated partial fracture surfaces 6.1, 6.2, 6.3 has a width of more than 3.2 mm. The middle partial surface 6.3 is also divided by the borehole 3 into two areas that are separated from one another. As a result of the nitriding process, the partial surfaces 6.1, 6.2 and 6.3 have a hardened peripheral area 7 and an unhardened core section 8. The material of the hardened peripheral area 7 is more brittle than that of the unhardened core section 8. In FIG. 2, which is not to scale, the hardened peripheral area 7 is distinguished visually from the unhardened core section 8, as the hardened peripheral area 7 is visible as a dark edge around the lighter unhardened core section 8. The fracture surface 6 of the connecting rod 1 is characteristic of the connecting rod 1 obtained by the manufacturing method according to the present technology. As shown in FIG. 2, the unhardened core section 8 in each one of the partial surfaces 6.1, 6.2 and 6.3 is completely enclosed by a corresponding hardened peripheral area 7.

The thickness of the visible peripheral area 7 corresponds to the nitriding hardness depth. In some implementations, the nitriding hardness depth is of 0.4 to 0.7 mm. In some implementations, the nitriding hardness depth is of 0.6±0.1 mm. In some implementations, the peripheral area 7 can be partially removed from the bearing eye 2 by subsequent processing steps, such as grinding, so that the peripheral area 7 of the fracture surface 6 of the finished connecting rod 1 has a smaller thickness than that of the nitriding hardness depth.

Still referring to FIG. 2, the partial surfaces 6.1, 6.2, 6.3 of the fracture surfaces 6 are present in the form of elongated crosspieces that are separated from each other by the openings 4. Each crosspiece has a width D, which may vary from crosspiece to crosspiece, but which may not exceed a certain value. The width D is the dimension of the partial surfaces 6.1, 6.2, 6.3 that is taken along their respective shortest side. If a crosspiece has a width that is too large, the fracture separation process results in plastic deformation of the material in the unhardened core section 8 of the crosspiece. Upon reaching a nitriding hardness depth of 0.6 mm±0.1 mm, a maximum width D of the partial surfaces 6.1, 6.2, 6.3 of the fracture surface 6 of approximately 3 mm has been found to be suitable.

The width of the unhardened core section 8 is 1 to 3.5 times the nitriding hardness depth or the width of the hardened peripheral area 7, but could be otherwise in other implementations. The width of the unhardened core section 8 is not more than 2.2 mm, so that no point of the unhardened core section 8 has a distance greater than 1.1 mm from the closest hardened peripheral area 7.

As mentioned above, the connecting rod 1 is provided with at least one notch before fracture separation. In some implementations, the at least one notch is a laser score. As illustrated in the partial surface 6.1 of FIG. 2, laser scoring is performed on one of the two front sides of the first crosspiece adjacent to the bearing eye 2, but laser scoring could be performed elsewhere. The laser scoring process results in many small holes 9 that are located in the fracture surface 6 after fracture separation. The holes 9 extend parallel to the openings 4, but could extend otherwise. Since the connecting rod 1 according to the present technology is directed to be used in particular in two-stroke engines and that these engines have no bearing bushings disposed on the running surface of the bearing eye 2, the holes 9 are spaced from the running surface of the bearing eye 2. The holes 9 could be positioned otherwise in some implementations. In other words, the laser scoring forms the at least one notch, and the at least one notch is spaced from the running surface of the bearing eye 2. As seen in FIG. 2, the hardened peripheral area 7 that is adjacent to the bearing eye 2 does not have any holes 9 resulting from the laser scoring, but some implementations could.

Still referring to FIG. 2, the fracture surface 6 passes through the diameter of both openings 4, which take the form of boreholes, i.e. at the narrowest points of the crosspieces. The borehole 3 extends partially through the first partial surface 6.1 adjacent to the bearing eye 2, and an unhardened core section 8 is located between the borehole 3 and the bearing eye 2, the borehole 3 therefore having a greater distance from the bearing eye 2 than twice the nitriding hardness depth and twice the thickness of the hardened peripheral area 7 adjacent to the bearing eye 2. In some implementations, the borehole 3 could extend otherwise. The minimum width D of each crosspiece is more than twice the nitriding hardness depth. The connecting rod 1 may have chamfers, bevels or curves on its exterior surface, as shown on the partial surface 6.2.

Figure 3:
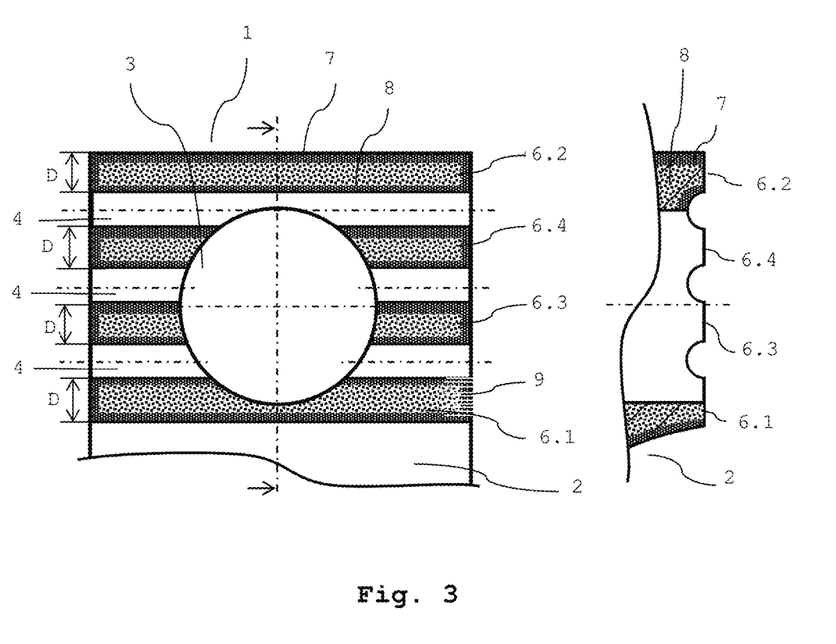
FIG. 3 schematically shows the fracture surface of another variant of a connecting rod according to the present technology in a top plan view and in a lateral cross-sectional view.

FIG. 3 shows another example of the fracture surface 6 of a connecting rod 1 according to the present technology. Compared to the example shown in FIG. 2, the connecting rod 1 of FIG. 3 has a larger cross-section. In order not to exceed the maximum width D of a crosspiece in the fracture plane, the connecting rod 1 is designed with a correspondingly larger number of openings 4. Alternatively, the diameter or the width of the openings 4 could be increased by drilling boreholes with a larger diameter or by making slotted holes as openings 4 with a milling cutter.

FIG. 3 also illustrates an alternative fracture surface, in which areas of the unhardened core section 8 are located directly adjacent to the borehole 3. This fracture surface results from the fact that, in an alternative implementation of the method of the present technology, the subsequent fracture surface 6 is initially provided with the openings 4, the connecting rod 1 is then case-hardened by nitriding and the borehole 3 is made only after the nitriding, for example by first providing the core drilling 5 and then drilling the borehole 3 as a counterbore extending past the subsequent fracture surface. However, the sequence of steps shown in FIG. 1 is adhered to, since then every partial fracture surface has a closed hardened peripheral area 7, which is advantageous with respect to the fracture behaviour.

In the variants according to FIG. 2 and FIG. 3, the two outer crosspieces, i.e. the crosspiece that is adjacent to the bearing eye 2 and the crosspiece that is adjacent to the side surface of the connecting rod 1, are designed to be wider than the intermediate crosspiece or crosspieces. In some implementations, the two outer partial surfaces 6.1, 6.2 have a width D of 2.3 to 2.7 mm. In some implementations, the two outer partial surfaces 6.1, 6.2 have a width D of 2.5 mm±0.1 mm. In some implementations, the intermediate partial surfaces 6.3, 6.4 have a width of 1.6 to 2.1 mm. In some implementations, the intermediate partial surfaces 6.3, 6.4 have a width of 1.85 mm±0.1 mm. In some implementations, the total width of the openings 4 is approximately equal (i.e. 0.9 to 1.1 times) to the total thickness of all the crosspieces in the fracture surface 6.

Figure 4:
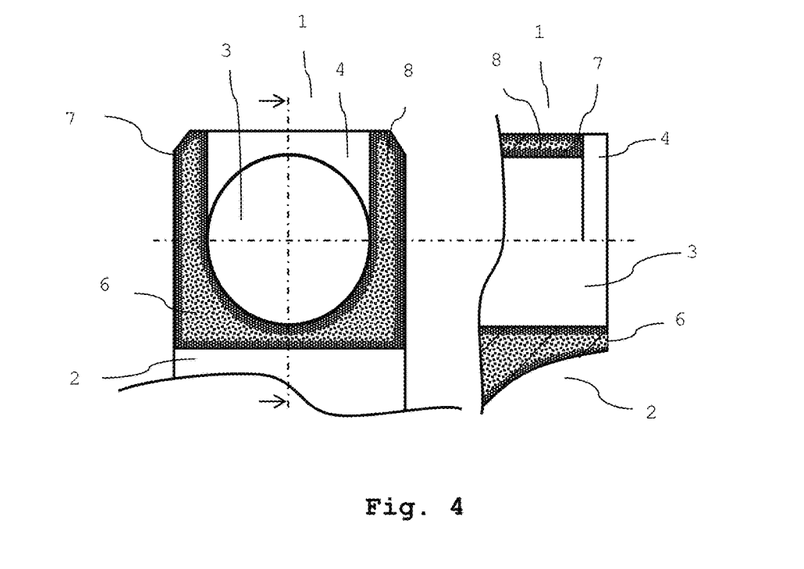
FIG. 4 schematically shows the fracture surface of a further variant of a connecting rod according to the present technology in a top plan view and in a lateral cross-sectional view.
Figure 5:
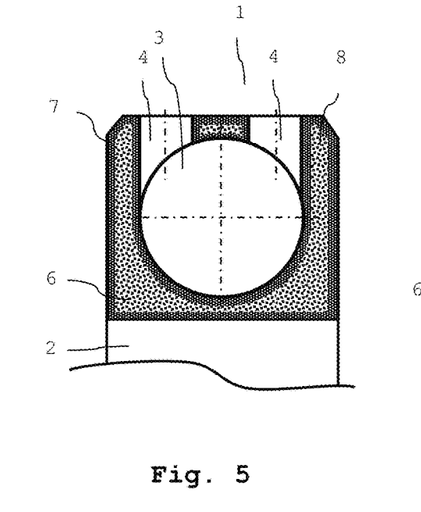
FIG. 5 schematically shows the fracture surface of a further variant of a connecting rod according to the present technology in a top plan view.
Figure 6:
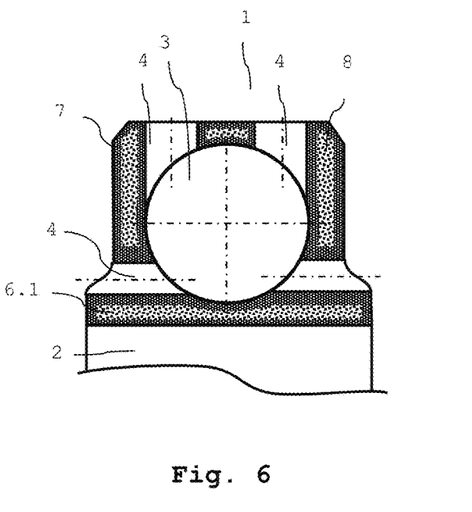
FIG. 6 schematically shows the fracture surface of a further variant of a connecting rod according to the present technology in a top plan view.

FIG. 4 shows an alternative connecting rod 1 according to the present technology that has been provided with an opening 4 extending radially in the direction of the bearing eye 2. The opening 4 has the shape of a slotted hole that has been produced by milling. Alternatively, it is also possible to provide several spaced openings 4 as boreholes extending perpendicularly to the longitudinal direction of the bearing eye 2, as shown in FIG. 5. As shown in FIG. 6, it is also possible according to the present technology to have several openings 4 extending in different directions through the fracture surface 6, where their longitudinal directions extend either parallel to the longitudinal direction of the bearing eye 2 through the fracture surface 6, or perpendicularly to the longitudinal direction of the bearing eye 2 into the fracture surface 6. Openings 4 may also have, for example, different diameters or width. In some implementations, the connecting rod 1 may have areas of different widths. For known designs of a connecting rod, the area around the bearing eye 2 is usually widened. According to the present technology, an opening 4 could be provided in the fracture surface 6 that separates this wider section of the connecting rod 1 located on the bearing eye 2 from the other partial fracture surfaces, so that, at the bearing eye 2, there is a correspondingly longer adjacent partial fracture surface than partial surface 6.1.

In the implementations shown in FIGS. 2 to 6, the side of the fracture surface 6 adjacent to the bearing eye 2 is not penetrated by the openings 4. In other words, only a partial fracture surface borders the bearing eye 2. Other implementations where the bearing eye 2 is penetrated by the openings 4 are contemplated.

In conclusion, after the present technology has been described by way of examples with reference to several implementations, reference should be made to several correlations which have proven to be advantageous in the design of the fracture surface 6 according to the present technology.

In some implementations, the width of the unhardened core section 8 is 1 to 4 times the nitriding hardness depth or the width of the peripheral area 7. The width of the unhardened core section 8 is not more than 2.2 mm, so that no point of the unhardened core section 8 has a distance greater than 1.1 mm from the closest hardened peripheral area 7. In some implementations, the maximum width of the unhardened core section 8 is not more than 1.8 mm, so that no point of the unhardened core section 8 in the fracture plane has a distance greater than 0.9 mm from the closest hardened peripheral area 7.

In some implementations, the openings 4 take the form of boreholes with a diameter of 3 to 5 mm. In some implementations, the boreholes have a diameter of 3.5 mm. In some implementations, a milling cutter with a diameter of 3 to 5 mm is used for the production of other openings 4. In some implementations, a milling cutter with a diameter of 3.5 mm is used for the production of other openings 4. In some implementations, the borehole 3 has a diameter of 8 to 10 mm. In some implementations, the borehole 3 has a diameter of 9.5 mm.

In some implementations, the total area of the openings 4 and the borehole 3 in the fracture plane is 1.4 to 1.8 times the sum of the areas of the partial fracture surfaces.

In some implementations, the sum of the areas of the unhardened core sections 8 is at least 30% of the sum of the areas of the partial fracture surfaces. In a variant, at least 90% of the fracture surface 6 exhibits a brittle fracture microstructure. In a further variant, 100% of the fracture surface 6 exhibits a brittle fracture microstructure.

In some implementations, the area of the unhardened core section 8 is between 30% and 75% of the total area of the partial fracture surfaces.

In some implementations, each fracture surface 6 exhibits at least two closed fracture surface parts which are separate from one another, e.g. in the form of the partial fracture surfaces 6.1, 6.2.

In some implementations, each fracture surface 6 exhibits at least four closed partial fracture surfaces which are separate from one another, e.g. in the form of the partial fracture surfaces 6.1, 6.2, 6.3 shown in FIG. 2.

In some implementations, the connecting rod 1 is made of steel that can be case-hardened by nitriding. In a variant, the connecting rod 1 is made of nitrided steel or tempering steel with a carbon content of 0.2% to 0.5%. In some implementations, the connecting rod 1 is made of the steel 31CrMoV9, which can be case-hardened by nitriding, the steel having a carbon content of approximately 0.32%. In some implementations, the microstructure of the unhardened core section 8 is bainite, which is a tempering intermediate structure of steel.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A fracture-separated engine component for an internal combustion engine comprising first and second parts each having a fracture surface extending along a fracture plane, wherein:
   the engine component is case-hardened by nitriding and has a nitriding hardness depth of 0.4 to 0.7 mm;
   the two fracture surfaces have hardened peripheral areas and unhardened core sections; and
   no point of the unhardened core sections located in the fracture plane is located at a distance greater than 1.1 mm from a nearest hardened peripheral area.

2. The fracture-separated engine component according to claim 1, wherein:
   at least one opening extends longitudinally in the fracture plane of each of the two fracture surfaces, such that each fracture surface is separated into at least two elongated partial fracture surfaces; and
   none of the at least two elongated partial fracture surfaces has a width of more than 3.2 mm.

3. The fracture-separated engine component according to claim 2, wherein:
   at least one of the two fracture surfaces comprises at least two openings extending longitudinally in the fracture plane of each of the two fracture surfaces, such that each of the two fracture surfaces is separated into at least three elongated partial fracture surfaces; and
   none of the elongated partial fracture surfaces has a width of more than 3.2 mm.

4. The fracture-separated engine component according to claim 1, wherein a borehole extends perpendicularly to the fracture plane through the fracture surfaces.

5. The fracture-separated engine component according to claim 2, wherein a borehole extends perpendicularly to the fracture plane through the fracture surfaces.

6. The fracture-separated engine component according to claim 5, wherein each one of the at least one opening defined in the fracture plane of each fracture surface extends at least partially through the borehole.

7. The fracture-separated engine component according to claim 1, wherein each one of the unhardened core sections of the fracture surfaces is completely enclosed by a corresponding one of the hardened peripheral areas.

8. The fracture-separated engine component according to claim 1, wherein the first and second parts of the engine component form a connecting rod having a bearing eye comprising a running surface.

9. The fracture-separated engine component according to claim 8, wherein at least one of the two fracture surfaces has a notch that is spaced from the running surface of the bearing eye.

10. The fracture-separated engine component according to claim 9, wherein the notch is a laser score.

11. The fracture-separated engine component according to claim 2, wherein:
the engine component is a connecting rod having a bearing eye; and
centres of all of the at least one opening and the bearing eye are located on a straight line.

12. The fracture-separated engine component according to claim 1, wherein the distance is smaller than or equal to 0.9 mm.

13. The fracture-separated engine component according to claim 1, wherein the engine component is one of a connecting rod, a crankshaft and a cylinder head.

14. A method for manufacturing an engine component, comprising:
providing the engine component such that each one of subsequent fracture surfaces has a cross sectional face comprising elongated partial fracture surfaces with a width of less than 3.2 mm;
nitriding the engine component until a nitriding hardness depth of 0.4 to 0.7 mm is reached;
cooling the engine component such that each one of the subsequent fracture surfaces reaches a temperature below −100° C.; and
fracture-separating the engine component at at least one predetermined fracture point into at least two parts while the temperature of each one of the subsequent fracture surfaces is below −100° C.

15. The method according to claim 14, further comprising providing at least one notch defining one of the at least one predetermined fracture point.

16. The method according to claim 14, wherein the step of nitriding has a duration of approximately 80 hours.

17. The method according to claim 14, wherein the step of cooling brings the temperature of the engine component between −120° C. and −130° C.

18. The method according to claim 14, wherein the step of fracture-separating is performed with a force of 2 to 4 kN.

19. The method according to claim 14, wherein the step of fracture-separating is performed 5 to 30 seconds after the cooling step.

20. The method according to claim 14, further comprising providing at least one borehole in the engine component before the nitriding step.

* * * * *